(12) United States Patent
Tanaka et al.

(10) Patent No.: US 9,071,360 B2
(45) Date of Patent: Jun. 30, 2015

(54) OPTICAL TRANSCEIVER HAVING IMPROVED FUNCTIONS TO LOAD CONTROL PROGRAM

(71) Applicant: SUMITOMO ELECTRIC INDUSTRIES, LTD., Osaka-shi, Osaka (JP)

(72) Inventors: Yasuhiro Tanaka, Yokohama (JP); Hiroto Ishibashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 130 days.

(21) Appl. No.: 13/783,689

(22) Filed: Mar. 4, 2013

(65) Prior Publication Data
US 2013/0236190 A1  Sep. 12, 2013

(30) Foreign Application Priority Data

Mar. 7, 2012 (JP) ................................. 2012-050952
May 7, 2012 (JP) ................................. 2012-106138

(51) Int. Cl.
*H04B 10/40* (2013.01)

(52) U.S. Cl.
CPC ..................................... *H04B 10/40* (2013.01)

(58) Field of Classification Search
None
See application file for complete search history.

(56) References Cited

U.S. PATENT DOCUMENTS

| 2002/0162098 A1* | 10/2002 | Suzuki | 717/168 |
| 2002/0181894 A1* | 12/2002 | Gilliland et al. | 385/88 |
| 2006/0017510 A1* | 1/2006 | Momii et al. | 331/1 A |

FOREIGN PATENT DOCUMENTS

JP  2011-109400 A  6/2011

OTHER PUBLICATIONS

INF-8074i Specification for SFP Transceiver (published May 12, 2001 by SFF Comittee).*
INF-8077i Specification for CFP Transceiver (published Aug. 31, 2005 by SFF Comittee).*
"INF-8074i Specification for SFP (Small Formfactor Pluggable) Transceiver", Rev. 1.0, May 12, 2001, pp. 1-38.
"Downloading (In-Circuit Programming) via PC," ADuC 7023, p. 36, Analog Devices.
"LPC111x/LPC11Cxx Serial Wire Debug (SWD)", NXP, Chapter 27, Rev. 12-24 User Manual, pp. 442-443, Sep. 2012.
"C2 Interface", C8051F31x Manual, Rev. 1.7, pp. 223-225, Silicon Labs.

* cited by examiner

*Primary Examiner* — David Payne
*Assistant Examiner* — Casey Kretzer
(74) *Attorney, Agent, or Firm* — Global IP Counselors, LLP

(57) ABSTRACT

Methods to load control programs into an optical transceiver whose specifications follow the standards are disclosed. The standard transceiver, such as SFP transceiver and/or XFP transceiver, provides control terminals in addition to the serial interface to communicate with the host device. The control terminals are inactive when the transceiver is output of the host device. The loader to load the program utilizes those control terminals and the optical transceiver of the invention provides mechanisms to use those control terminals for downloading the program.

14 Claims, 9 Drawing Sheets

US 9,071,360 B2

OPTICAL TRANSCEIVER HAVING IMPROVED FUNCTIONS TO LOAD CONTROL PROGRAM

CROSS-REFERENCE TO RELATED APPLICATIONS

This application claims priority to Japanese Patent Application No. 2012-050952, filed in Japan on Mar. 7, 2012, and Japanese Patent Application No. 2012-106138, filed in Japan on May 7, 2012. The entire disclosures of Japanese Patent Application No. 2012-050952 and Japanese Patent Application No. 2012-106138 are hereby incorporated herein by reference in their entirety.

BACKGROUND OF THE INVENTION

1. Field of the Invention

The present application relates to an optical transceiver, in particular, the application relates to an optical transceiver whose architecture follows standards defined by multi sources.

2. Background Arts

Optical transceivers, in particular, pluggable optical transceivers generally follow multi-source agreements (hereafter denoted as "MSA") for electronic and mechanical specifications thereof. For instance, one of the MSAs regarding to, what is called, the small form factor pluggable (SFP) defines several control signals called as MOD_DEF0, MOD_DEF1 and MOD_DEF2. Another MSA called as the XFP (10 Gbit Small Form Factor Pluggable) also defines control signals, or control pins of Mod_Abs, Mod_DeSel, P_Down, and Tx_DIS.

In another aspect, the optical transceivers are necessary to be revised in a control program thereof. The optical transceivers generally provide a controller to execute a program stored in the controller to monitor or detect statuses within the optical transceiver. The program is necessary to be revised by downloading a new program from an external system. However, the SFP transceivers and/or the XFP transceivers have no extra terminals available for downloading the program. Several techniques to download a new program, namely, a revised program, have been proposed. For instance, the revised program is to be transferred in a form of optical signals by using an optical receiver installed in the optical transceiver.

SUMMARY OF THE INVENTION

An aspect of an embodiment according to the present invention relates to a pluggable optical transceiver that is to be set in a host system. The pluggable optical transceiver includes a controller with a memory that stores a program by which the pluggable optical transceiver monitors and controls statuses within the pluggable optical transceiver. The pluggable optical transceiver provides first to third control terminal in order to communicate with the host system. One of features of the pluggable optical transceiver is that the first control terminal is pulled down to the ground by a resistor such that the host system is able to detect whether the pluggable transceiver is set therein or not. Moreover, the controller in the pluggable optical transceiver has a download interface including a clock terminal and a data terminal for the download clock and the download data of the program, and the download interface becomes in a hold mode when the pluggable transceiver is set in the host system.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF PREFERRED EMBODIMENTS

Next, some preferred embodiments according to the present invention will be described as referring to drawings. In the description of the drawings, numerals or symbols same or similar to each other will refer to elements same or similar to each other without overlapping explanations.

Figure 1:
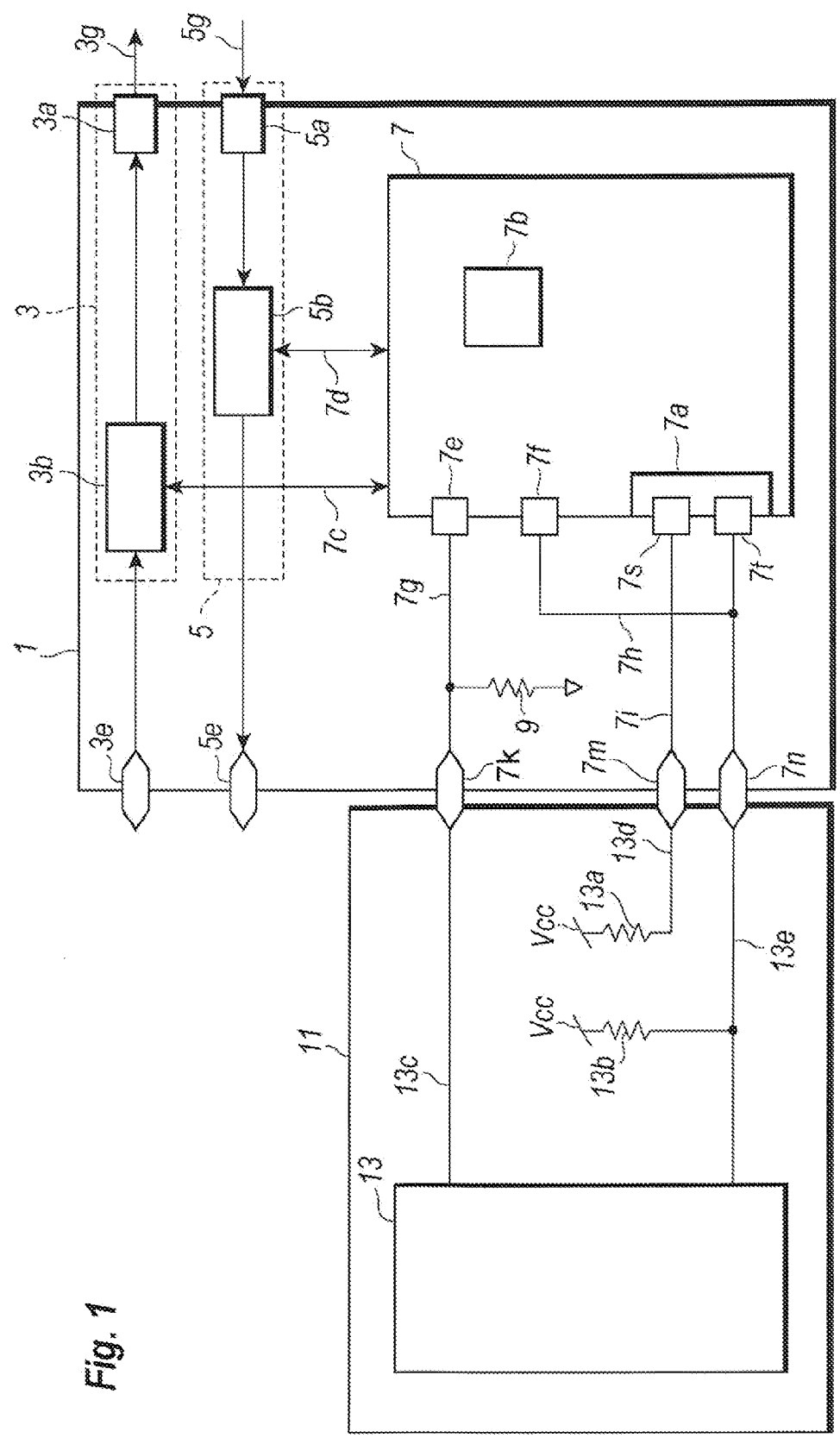
FIG. 1 shows a functional block diagram of a pluggable optical transceiver type of the SFP transceiver couples with the loader to load a control program into the SFP transceiver.
Figure 2:
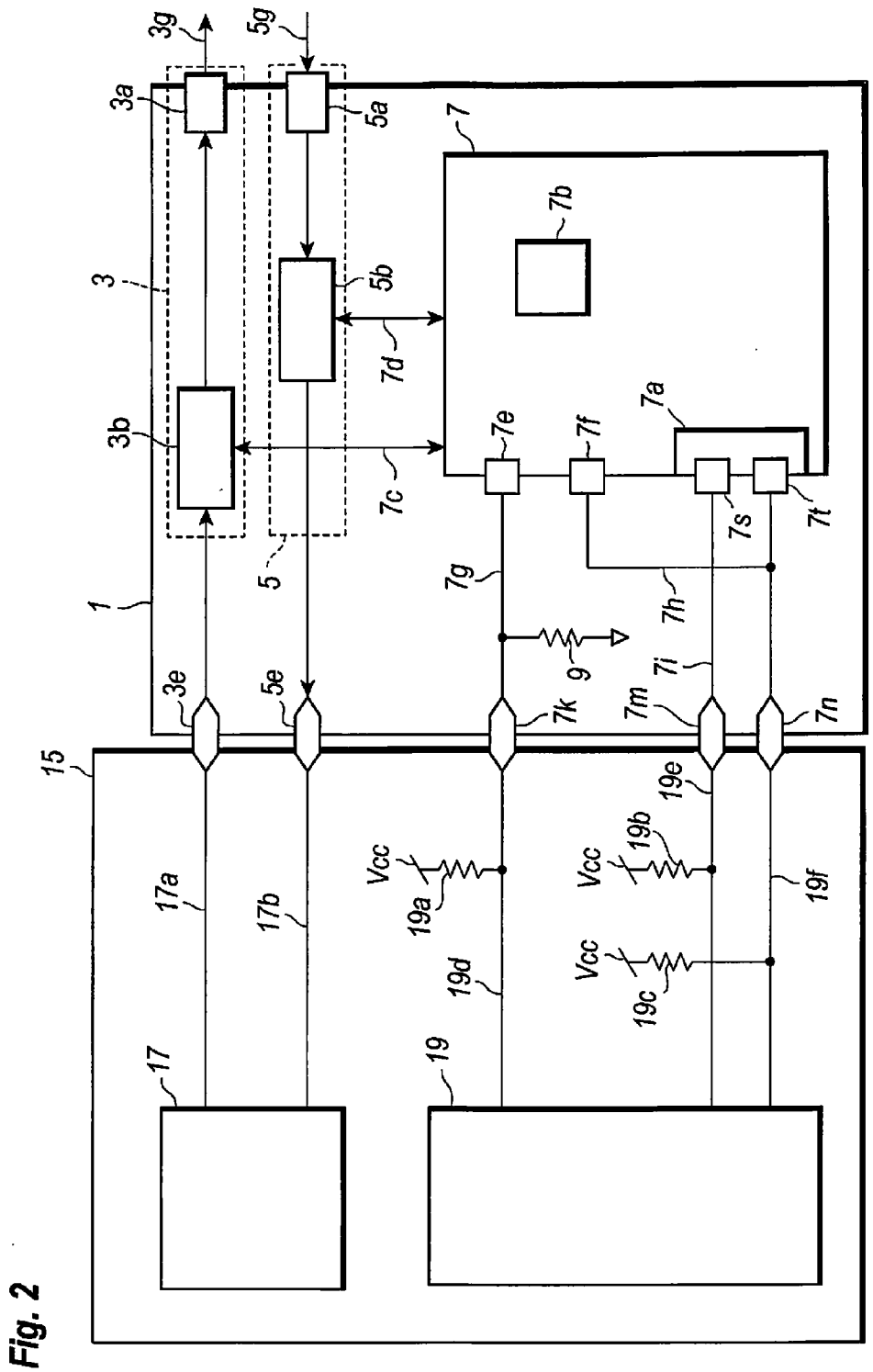
FIG. 2 shows a functional block diagram of the SFP transceiver set in the host system.

FIG. 1 shows a functional block diagram of an optical transceiver type of the SFP transceiver according to an embodiment of the invention, where the SFP transceiver is coupled with a loader 11 to load the revised program, and FIG. 2 shows another functional block diagram of a system including the SFP transceiver shown in FIG. 1 and a host device communicating with the optical transceiver 1 that sets the SFP transceiver 1 shown in FIG. 1 therein.

The SFP transceiver 1 shown in FIGS. 1 and 2, communicates with the loader 11, or the host device 15. The SFP transceiver 1 also communicates with another optical transceiver, which is not shown in the figures, through optical fibers by sending/receiving optical signals, 3g and 5g.

The SFP transceiver 1 includes an optical transmitter 3; an optical receiver 5; a controller 7 with some ports including that for a download clock 7e and that for a download data 7f; a pull-down resistor 9; a signal input port 3e, a signal output port 5e, and three control terminals including, MOD_DEF0 7k, MOD_DEF1 7m, and MOD_DEF2 7n. The ports, 7e and 7f constitute the download interface in the present embodiment. The terminal MOD_DEF0 7k is connected with the clock terminal 7e by the clock line 7g, MOD_DEF2 is connected with the data terminal 7f by the data line 7h. The signal ports, 3e and 5e, and three control terminals, 7k to 7n, in the functions and specifications thereof are defined in the SFP standard, and capable of being coupled with terminals prepared in the loader 11 and/or the host device 15.

The SFP transceiver in the MSA thereof defined several control pins. The MOD_DEF0 7k detects a status where the optical transceiver is set within the host system or not; the MOD_DEF1 7m is prepared for a clock signal, and the MOD_DEF2 7n is for a data signal, where they follow the I2C standard concerning to the serial interface with two wires. Two control lines, MOD_DEF1 7m and MOD_DEF2 7n are connected in the I2C port in the optical transceiver.

The optical transmitter 3 converts electrical signal provided in the signal input port 3e into an optical signal 3g to be output from the SFP transceiver 1. The optical transmitter 3 includes a light-emitting device 3a, typically, a semiconductor laser diode 3a and a driver to driver the light-emitting device 3a. Information, such as optical output power, a temperature of the light-emitting device, and so on, is transferred to the controller 7 through the control lines 7c.

The optical receiver 5 converts an optical signal incoming to the SFP transceiver 1 to an electrical data to be output to the host device 15. The optical receiver 5 includes a light-emitting device, typically a semiconductor photodiode, to convert the optical signal into an electrical signal, and a pre-amplifier to amplifier electrical signal to be processed by the host device 15. The optical receiver 3 communicates with the controller 7 through the control line 7d.

The controller 7 includes a CPU, an I2C port 7a, a memory 7b including a read only memory (ROM) and a random access memory (RAN), which are not explicitly shown in the figures. The memory 7b stores the program. The CPU controls the whole of the SFP transceiver 1 by executing this program as accessing the RAM, the ROM, and/or the I2C port 7a. In particular, the controller 7 monitors various parameters of, for instance, a fluctuation of the power supply, a variation of the inner temperature of the SFP transceiver 1, an operation of the light-emitting device 3a, the driver 3b, and the TIA 5b. The controller 7 activates/inactivates the optical transmitter 3 and/or the optical receiver 5, sets the transmission speed for the optical transmitter 3, and so on.

The download interface includes the port 7e for the download clock connected to MOD_DEF0 7k by the clock line 7g and that 7f for the download data connected to MOD_DEF2 7n by the data line 7h. The clock line 7g is pulled down to the ground by the resistor 9, which means that MOD_DEF0 7e is pulled down. The clock line 7g and the data line 7h may constitute the internal I2C bus; while, MOD_DEF1 7m and MOD_DEF2 7n constitute an external I2C bus attributed to the SFP transceiver 1.

The I2C port 7a provides the clock port 7s connected to MOD_DEF1 7m by the clock line 7i and the data port 7t connected to MOD_DEF2 7n buy the data line 7h. The clock line 7i and the data line 7h constitute the internal I2C bus.

The I2C port 7a may include a memory and/or registers. The memory in the I2C port 7a temporarily stores a data to distinguish the optical transceiver 1. The register in the I2C port 7a is accessible from the CPU in the controller 7 when the CPU executes the program. Although FIGS. 1 and 2 integrate the I2C port 7a within the controller 7, the I2C port 7a may be independent of the controller 7.

FIG. 1 also shows the loader 11 to provide a program to the memory 7b. The controller 7 downloads the program from the loader 11 using two ports of MOD_DEF0 7k and MOD_DEF2 7n. The loader 11 includes a downloader 13, pull up resistors, 13a and 13b, a clock line 13c, a signal line 13d, and a data line 13e. The signal line 13d is pulled up to the power supply Vcc by the resistor 13a. The data line 13e is also pulled up to the power supply Vcc by the resistor 13b. The data line 13e and the clock line 13c constitute the I2C bus in the loader 11.

When the loader 11 sets the optical transceiver 1 therein, the downloader 13 is connected to MOD_DEF0 7k by the clock line 13c and MOD_DEF2 7n by the data line 13e. On the other hand, MOD_DEF1 7m is forced to be pulled up by the resistor 13a through the signal line 13d. In this case, the clock line 13c and the data line 13e constitute the I2C bus.

The clock port 7e, when the loader 11 is set with the SFP transceiver 1, receives a download clock used for downloading a program from the downloader 13 through MOD_DEF0 7k, and the clock line 7g. That is, the controller 7 in the SFP transceiver 1 may receive the download clock from the downloader 13 through the clock line 13c in the loader 11, MOD_DEF0 7k and the clock line 7g in the SFP transceiver 1, and the clock port 7e when the loader 11 is set with the optical transceiver 1.

Also, the data port 7f may receive the program from the downloader 13, through the data line 13e, MOD_DEF2 7n, and the data line 7h, in the SFP transceiver 1, when the loader 11 sets the SFP transceiver 1. Thus, the program is to be stored in the memory 7b.

Next, the operation of the SFP transceiver 1 will be described when a program is downloaded, that is, when the SFP transceiver 1 is coupled with the loader 11. As shown in FIG. 1, the optical transceiver 1 is first set within the loader 11 when a program is downloaded from the loader 11. Then, the clock port 7e and the data port 7f in the controller 7 are coupled with the downloader 13 through MOD_DEF0 7k, and MOD_DE2 7n. Because the downloader 13 and the download interface, 7e and 7f, have enough capacity to drive the clock line 7g pulled down to the ground by the resistor 9 and the data line 13e pulled up to the power supply Vcc by the resistor 13b; the download of the program PR from the downloader 13 to the controller 7 may be reliably carried out.

Figure 3A:
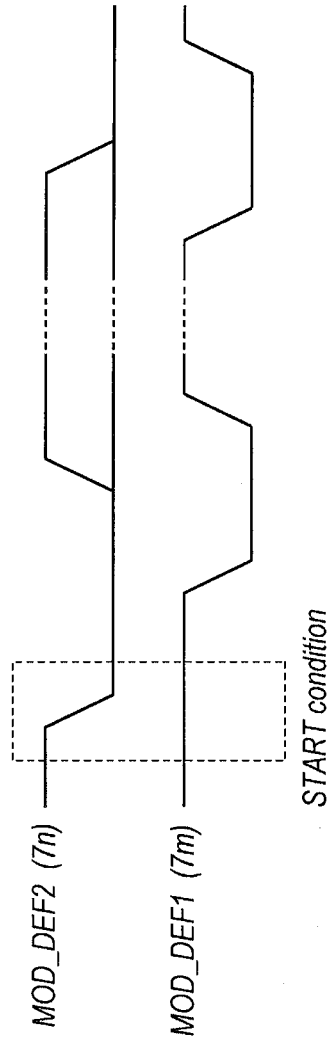
FIG. 3A is a time chard of SCL and SDA of two-wired serial bus types of I2C.
Figure 3B:
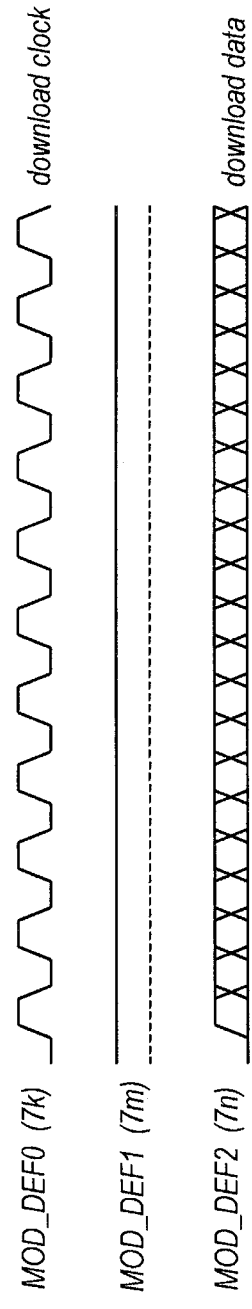
FIG. 3B shows time charts of signal appeared in control terminals of MOD_DEF0, MOD_DEF1, and MOD_DEF2 of the SFP transceiver when the SFP transceiver is set in the download mode.

According to the specification of I2C bus, which is constituted by the serial clock line SCL 7i and the serial data line SDA 7h, as shown in FIG. 3A, the I2C port 7a becomes active when SCL 7s, namely, MOD_DEF0 7m is set HIGH, during SDA 7t, MOD_DEF2 becomes LOW. When the loader 11 sets the optical transceiver 1 as shown in FIG. 1, MOD_DEF1 7m, namely, the SCL 7s of the I2C port 7a, is pulled up by the resistor 13a, which means the SCL 7s is permanently kept HIGH. Under such condition, when a signal appearing in MOD_DEF2 7n, namely, the SDA 7t of the I2C port 7a, varies; the I2C port 7a becomes active. However, in the embodiment shown in FIG. 1, when the I2C port 7a is set in the receiver mode, namely, the SDA terminal becomes high impedance, just after the activation thereof; the I2C port 7a keeps the receiver mode appearing just after the activation, because the MOD_DEF1 7m, the SCL 7r of the I2C port 7a, is kept HIGH by being pulled up. The I2C port 7a keeps the receiver mode because MOD_DEF1 7m, the SCL 7s of the I2C port 7a, is pulled up, in which the I2C port 7a does not begin to communicate with the downloader 13 anymore. Accordingly, when the SCL 7s of the I2C port 7a is pulled up by the resistor 13a in the loader 11, which means that the loader 11 sets the SFP transceiver 1 therein, the loader 13 may communicate with the controller 7 independent of the I2C port 7a through the download interface, 7e and 7f. Thus, the loader 11 may download a program, namely, a revised control program, by using three terminals, 7k, 7m, and 7n, each corresponding to the terminals of MOD_DEF0 MOD_DEF1, and MOD_DEF2, respectively, defined in the SFP standard.

In order to transfer the download clock from the downloader 13 to the clock terminal 7e in the controller 7, the controller 7 is necessary to detect HIGH at the terminal 7e when the downloader 13 outputs HIGH. Then, the pull-down resistor 9 has resistance thereof determined such that, assuming the threshold to discriminate the levels is $V_{TH}$, the level $V_{MOD\_DEF0}$, which is determined by a current flowing in the pull-down resistor 9, of the terminal 7e is necessary to be:

$$V_{MOD\_DEF0} > V_{TH}, \text{ and } V_{MOD\_DEF0} = I_{R9} \times R_9,$$

that is, $$R_9 > V_{TH}/I_{R9}.$$

FIG. 2 is a functional block diagram of an optical transceiver 1 set in the host system 15 that includes a signal processing unit 17 (hereafter denoted as "SPU") and a host controller 19. The SPU 17 outputs a driving signal, which corresponds to the transmitting optical signal 3g output from the SFP transceiver 1, and processes a received signal, which corresponds to the receiving optical signal 5g. The host system 15 further provides signal lines, 17a and 17b; pull up resistors, 19a to 19c; a clock line 19d; another clock line 19e; and a data line 19f.

The pull up resistor 19a pulls the clock line 19d up to the power supply Vcc, where the pull up resistor 19a has resistance greater than 4.7 kΩ but less than 10 kΩ by the SFP specification. The second pull up resistor 19b pulls the clock line up to the power supply Vcc. The third pull up resistor 19c pulls the data line 19f up to the power supply Vcc.

The clock line 19d, when the SFP transceiver 1 is set in the host system 15, is connected to MOD_DEF0 7k, which means that the line 7g in the SFP transceiver is pulled up to the power supply Vcc by the pull up resistor 19a and pulled down to the ground by the pull down resistor 9. Also, MOD_DEF1 7m is pulled up by the resistor 19b, while, MOD_DEF2 7n is pulled up by the resistor 19c. The clock line 19e and the data line 19f in the host system 15 operate as the SCL and the SDA of the I2C bus.

The controller 7 in the SFP transceiver 1 receives the serial clock from the host controller 19 through the clock line 19e, MOD_DEF1 7m, the clock line 7i, and the clock terminal 7s of the I2C port 7a, while, the serial data also comes from the host controller 19 through the data line 19f, MOD_DEF2 7n, the data line 7h, and the data terminal 7t in the I2C port 7a.

Next, an operation of the optical transceiver 1 set in the host system 15 will be described. The host controller 19 concurrently controls the SPU 17 and the controller 7 in the SFP transceiver 1. Specifically, the controller 19 first detects whether an SFP transceiver 1 is set in the host system 15 or not. In order to detect the existence of the SFP transceiver 1 reliably, the resistance $R_{19a}$ of the pull up resistor 19a and that $R_9$ of the pull-down resistor 9 are adequately set. Assuming the threshold to distinguish the LOW level is $V_{THL}$ and a practical level of the clock line 19d, namely, MOD_DEF0 7k, to be $V_2$; a condition $V_2 < V_{THL}$ is necessary to be satisfied. Further assuming the current flowing in the resistor 19a and the resistor 9 to be $I_2$, conditions below are obtained:

$$Vcc = (R_{19a} + R_9) \times I_2, \text{ and}$$

$$V_2 = R_9 \times I_2.$$

Then, the condition below is finally determined:

$$R_9 = < V_{THL} \times R_{19a}/(Vcc - V_{THL}).$$

Under such a condition, the clock terminal 7e is kept in LOW. Then, the download interface of the terminals, 7e and 7f, to download the program is set in WAIT mode, that is, the data terminal 7f of the controller 7 is set in high-impedance. The download interface of the terminals, 7e and 7f, become inactive during the clock terminal 7e is set in LOW. The controller 19 of the host system can normally communicate with the I2C port 7a independent of the download interface, 7e and 7f. Thus, the optical transceiver 1 implemented with the download interface according to the present embodiment can normally operate even the SFP transceiver 1 is set within a conventional host system 15. Also, the SFP transceiver 1 does not revise the program, the control program, when the SFP transceiver 1 is set in the host system 15 because the clock terminal 7e is kept in LOW.

The optical transceiver 1 thus described connects the clock terminal 7e and the data terminal 7f, each provided for downloading the program, to the terminals, 7k and 7n, respectively, where the terminals, 7k and 7n, correspond to MOD_DEF0 and MOD_DEF2 in the SPF standard. Accordingly, a revised program is downloaded from the loader 11 to the memory 7b without additional processing to add an electrical connector specific to the optical transceiver 1, making the circuit complex, making the size of the circuit large, increasing the cost to produce the optical transceiver 1; only by using terminals existing in the SFP transceiver 1 following the SFP standard.

The terminal 7k, namely, MOD_DEF0 in the SFP standard, is pulled down to the ground. When the optical transceiver 1 is set in the host system 15, MOD_DEF0 7k is set in LOW. The clock terminal 7e of the controller 7, which is used in the download of the revised program, is connected to MOD_DEF0 7k, which means that the clock terminal 7e normally becomes LOW except for a state the host controller 19 outputs the clock for the download. Accordingly, MOD_DEF0 7k reliably shows the function defined in the MSA of the SFP standard, that is, the host system 15 detects whether the optical transceiver 1 is set therein. Also, the host system 15 communicates with the SFP transceiver 1 by the terminals, 7m and 7n, corresponding to MOD_DEF1 (SCL) and MOD_DEF2 (SDA) of the two-wired serial interface.

(First Modification)

Figure 4:
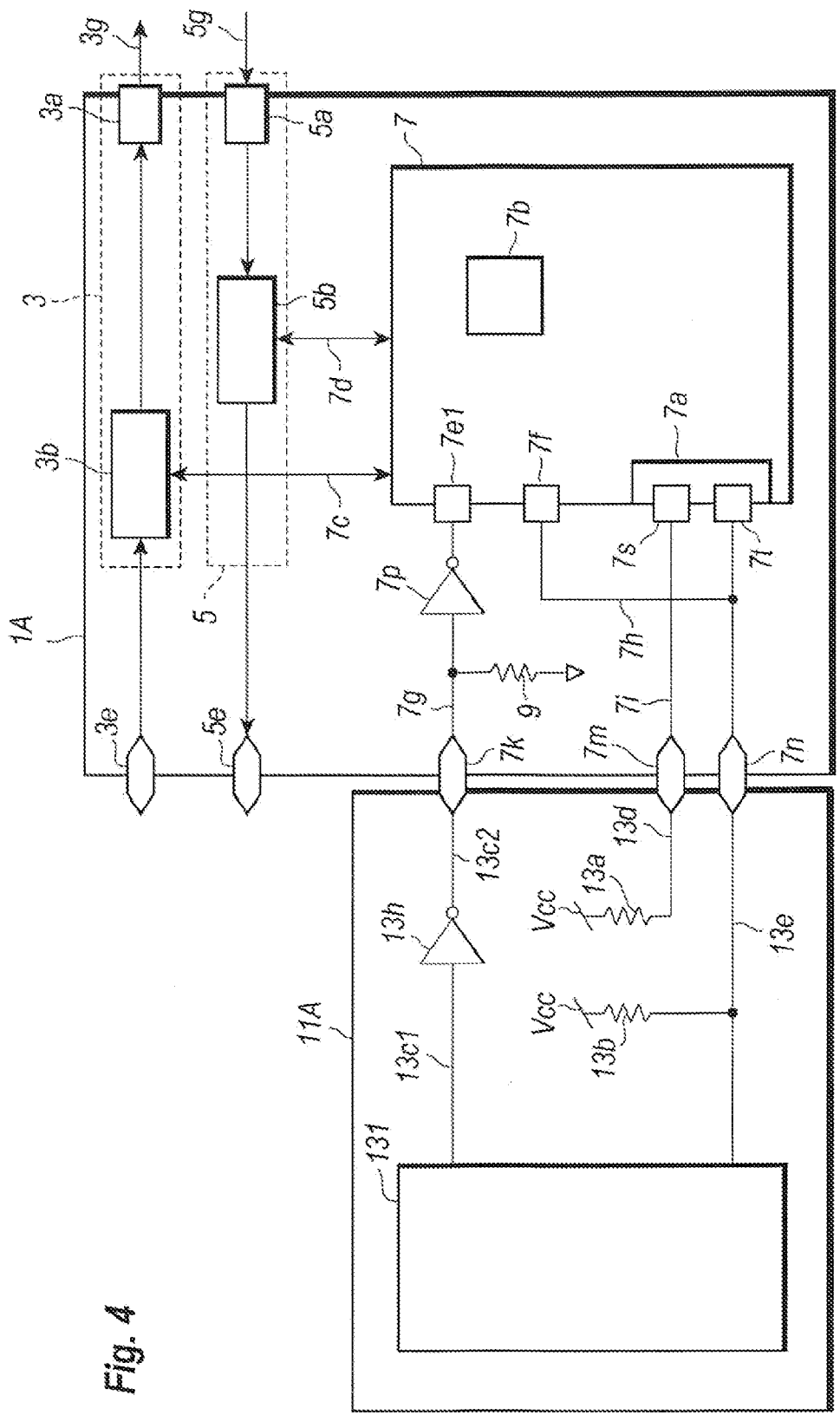
FIG. 4 shows a functional block diagram of the SFP transceiver having a modified peripheral circuit for the download interface and the load, where they are according to a modified embodiment of the SPF transceiver shown in FIG. 1.

FIG. 4 shows a functional block diagram of another SPF transceiver 1A according to a first modified example. The optical transceiver 1A shown in FIG. 4 provides the clock terminal 7e1, instead for the terminal 7e in the aforementioned embodiment, and includes an inverter 7p in the clock line 7g between the terminal 7k and the clock terminal 7e1. When the modified optical transceiver 1A is set in the host system 15, or the loader 11A, the clock terminal 7e1 is kept in HIGH, while, the former embodiment 1 is kept in LOW.=

For the modified optical transceiver 1A, a modified loader 11A shown in FIG. 4 is replaced. The modified loader 11A includes an inverter 13h on the clock line 13c between the terminal 7k and the downloader 131, that is, the clock line 13c is divided by the inverter 13h into two lines, 13c1 and 13c2.

When the downloader 131 outputs HIGH in the clock line 13c1, the clock terminal 7e1 of the controller 7 receives HIGH. That is, when the SFP transceiver 1A receives the revised program from the downloader 131, the clock output from the downloader 131 is just reflected in the clock terminal 7e1 after being inverted twice. The modified embodiment shown in FIG. 4 only reverses the phase of the clock for the download. Thus, the modified optical transceiver 1A is capable of revising the control program stored in the memory 7b without any modifications of the fundamental architecture thereof.

Figure 5:
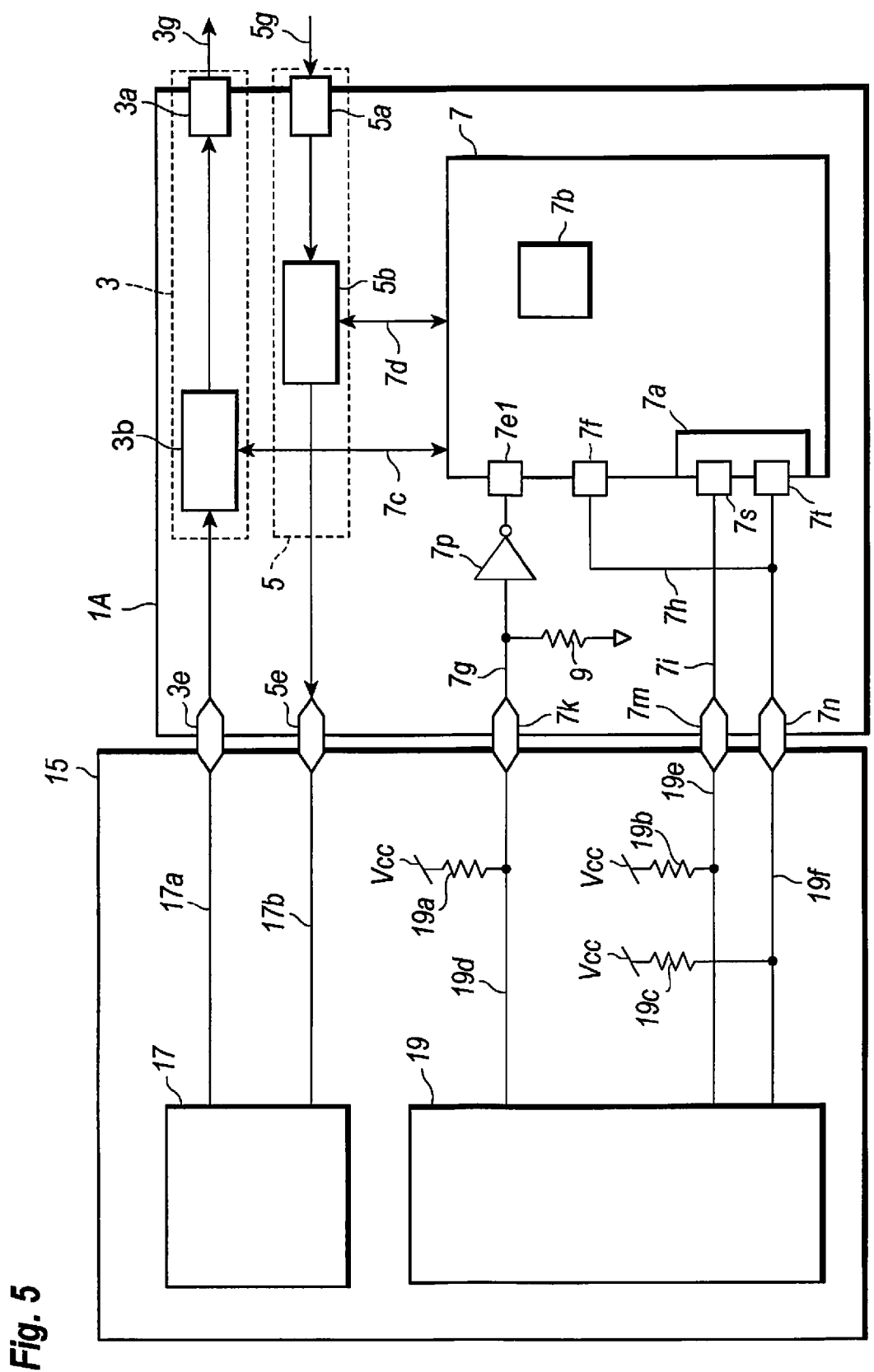
FIG. 5 shows a functional block diagram of the modified SPF transceiver shown in FIG. 4, where the modified SFP transceiver is set in the conventional host system.

The modified optical transceiver 1A shown in FIG. 4, even when it is set in a conventional host system, may communicate with the host system 15. FIG. 5 is a functional block diagram of the modified optical transceiver 1A set in a conventional host system 15. Because the terminal 7k (MOD_DEF0) is set in LOW by resistors, 19a and 9, the host controller 19 may detect the existence of the SFP transceiver 1A. The download interface of the clock terminal 7e1 and the data terminal 7f are set in WAIT mode, namely, the data terminal 7f is set in HIGH impedance, and the host controller 19 normally communicate with the I2C port 7a of the controller 7 through the two-wire serial lines, 19e and 19f, not affected by the download interface. Thus, the modified optical transceiver 1A may normally communicate with a conventional host system 15 even the optical transceiver 1A provides the download controller of the clock terminal 7e1 and the data terminal 7f.

Figure 6:
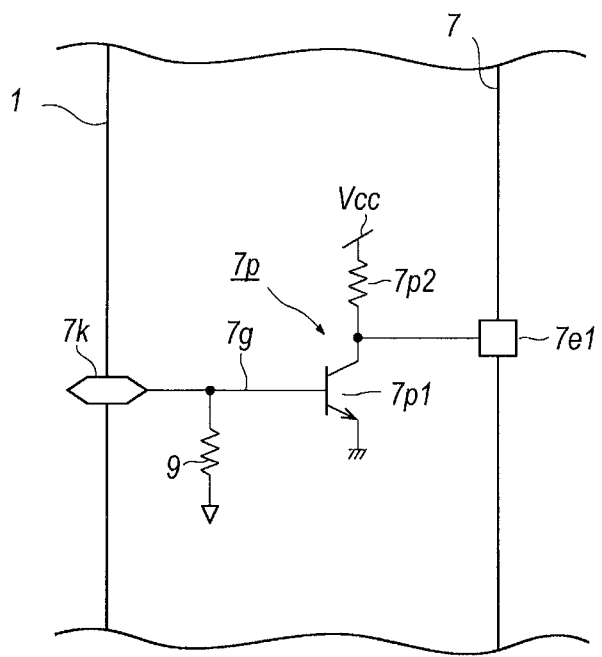
FIG. 6 is an example of a peripheral circuit of the download interface shown in FIGS. 4 and 5.

FIG. 6 shows an exemplary circuit around the clock terminal 7e1 including the inverter 7p in the modified optical transceiver 1A. An npn-transistor 7p1 may operate as an inverter 7p together with a load resistor 7p2 put between the collector of the transistor 7p1 and the power supply Vcc. The base of the transistor 7p1 is coupled with the terminal 7k (MOD_DEF0), while, the collector thereof is connected to the clock terminal 7e1. The transistor 7p1 reverses a signal put in the base thereof at the collector.

The operation of the circuit shown in FIG. 6 will be described as referring to FIG. 4. When the optical transceiver 1A is set in the loader 11A and the downloader 131 outputs, in the clock line 13c1 thereof, HIGH level; the base of the transistor 7p1 is in LOW because of the inverter 13h in the loader 11A, which turns off the transistor 7p1 and the collector thereof, namely, the clock terminal 7e1 of the controller 7, becomes HIGH. Oppositely, the downloader 131 outputs LOW on the clock line 13c1, the base of the transistor 7p1 becomes HIGH to turn on the transistor 7p1, which turns the collector thereof and the clock terminal 7e1 in LOW. Thus, the output of the downloader 131 is just reflected in the clock terminal 7e1, namely, the clock signal output from the downloader 131 is input to the clock terminal 7e1.

When the optical transceiver 1A is set in a conventional host system 15, because the base of the transistor 7p1 is connected to the terminal 7k (MOD_DEF0) and setting resistance of two resistors, 19a and 9, are such that the level thereof is less than the LOW threshold $V_{THL}$, the base of the transistor 7p1 becomes low, which turns off the transistor 7p1 and the collector thereof and the clock terminal 7e1 becomes HIGH. Then, the download interface, 7e1 and 7f, is set in WAIT mode to turn the data terminal in HIGH impedance. The two-wired serial interface, 19e and 19f, namely, the terminals 7m (MOD_DEF1) and 7n (MOD_DEF2) may be normally operable.

Second Embodiment

Figure 7:
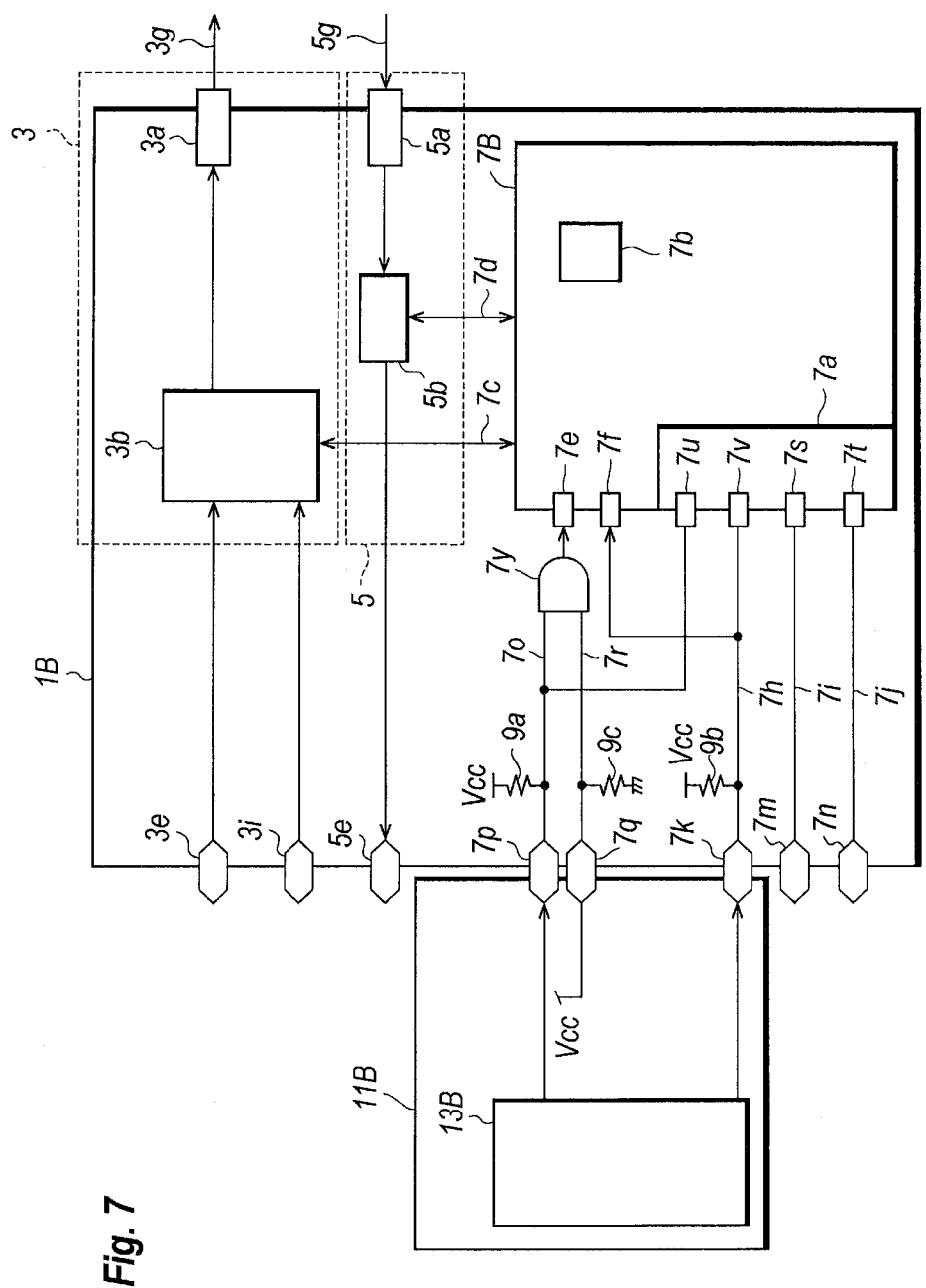
FIG. 7 shows a functional block diagram of an XFP transceiver could with the loader.
Figure 8:
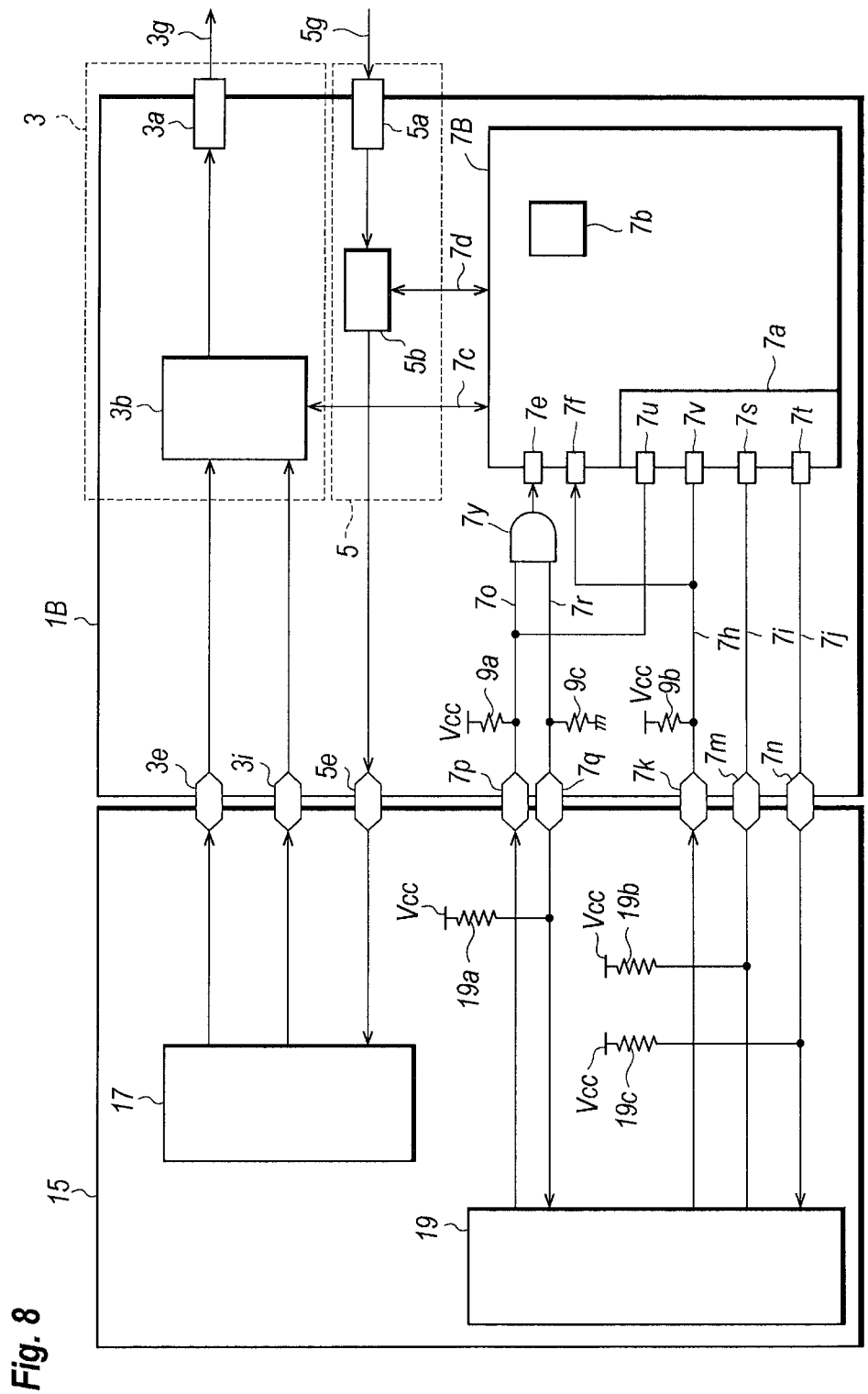
FIG. 8 shows a functional block diagram of the XFP transceiver shown in FIG. 7, where the XFP transceiver is set in the conventional host system.

FIG. 7 is a functional block diagram of an XFP transceiver 1B and a loader 11B; while, FIG. 8 is a functional block diagram of the XFP transceiver 1B set in the host system 15. The XFP transceiver 1B also includes an optical transmitter 3, an optical receiver 5, and a controller 7B. The optical transmitter 3 and the optical receiver 5 have arrangements substantially same to those in the aforementioned SFP transceiver 1. However, the controller 7B of the XFP transceiver 1B and circuits around the controller 7B, in particular, the circuits for communicating with the host system 15 are different from those in the SFP transceiver 1.

The XFP transceiver 1B includes, as external terminals, P_Down 7p, Mod_Abs 7q, Mod_DeSel 7k, SCL 7m, and SDA 7n. The Mod_Abs terminal 7q has similar a function with MOD_DEF0 in the SFP transceiver 1, that is, Mod_Abs terminal 7q is pulled down to the ground through a resistor 9c in the XFP transceiver 1B. The host system 15 may detect whether it receives the XFP transceiver 1B therein, or not by detecting a level of Mod_Abs terminal 7q. When it is grounded or LOW level, the XFP transceiver 1B is set within the host system.

The P_Down 7p makes the XFP transceiver 1B in a sleep mode, where only sensors and the controller are active by killing functions regarding the optical transmission and reception. The P_Down 7p saves the power consumption of the XFP transceiver 1B.

Two terminals, SCL and SDA have the same function with those of the SFP transceiver 1. The terminal Mod_DeSel 7k controls two-wired serial bus, SCL and SDA. When it is set HIGH, the I2C port 7a becomes inactive; then, MOD_DeSel 7k makes it possible to connect a plurality of I2C devices each having an address same to each other to the I2C bus, only one of which in MOD_DeSel 7k is set in LOW, the selected I2C device is able to communicate with the master device.

The controller 7B of the present embodiment also provides the I2C port 7a but terminals thereof includes four (4) ports, 7s, 7t, 7u, and 7v. The former two terminals, 7s and 7t, same as those in the SFP transceiver 1, are coupled with I2C terminals, SCL and SDA; while, the latter two terminals, 7u and 7v, are connected to the P_Down 7p and Mod_DeSel 7k, respectively.

The XFP transceiver 1B according to the present embodiment further provides an AND gate 7y connected between terminals of P_Down 7p and Mod_Abs 7q, and the clock terminal 7e of the controller 7B. Specifically, one of the inputs of AND gate 7y is coupled with P_Down 7p through the line 7o pulled up to the power supply Vcc by a resistor 9a, while, the other input of AND gate 7y is coupled with Mod_Abs 7q through another line 7r pulled down to the ground through another resistor 9c. The output of AND gate 7y couples with the clock terminal 7e of the download interface in the controller 7B. The data terminal 7f of the download interface is coupled with MOD_DeSel 7k through the line 7h which is pulled up to the power supply by a resistor 9b.

FIG. 7 includes another loader 11B to write a control program in the memory 7b of the controller 7B. Similar to that aforementioned loader 11 for the SFP transceiver 1, the loader 11B of the present embodiment includes a down loader 13B. The loader 11B is coupled with the XFP transceiver 1B by terminals of P_Down 7p, Mod_Abs 7q, and Mod_DeSel 7k. The downloader 13B downloads the program to the controller 7B by using the terminal P_Down 7p to provide the download clock and another terminal Mod_DeSel 7k to provide the download data, namely, the program. The last terminal Mod_Abs 7q sets the XFP transceiver 1B in the download mode.

When the XFP transceiver 1B is set in the loader 11B, the terminal Mod_Abs 7q is set in HIGH because the loader 1B pulls the line connected to the terminal Mod_Abs 7q up to the power supply Vcc directly, or through a pull-up resistor 9a. Then, AND gate 7y operates as a buffer to receive a signal provided to the terminal P_Down 7p. That is, the signal provided in the terminal P_Down 7p passes through AND gate 7y to reach the clock terminal 7e of the download interface. The data terminal 7f of the controller 7B is directly connected to the terminal Mod_DeSel 7k.

Thus, when the XFP transceiver 1B is coupled with the loader 11B, the clock terminal 7e receives the download clock from the downloader 13B through the terminal P_Down 7p, the line 7o, and AND gate 7y; while, the download data is provided through the terminal Mod_DeSel 7k and the line 7h. Because two lines, 7o and 7h, are pulled up to the power supply Vcc in the XFP transceiver 1B, they may constitute two-wired serial bus, for instance, I2C bus. In other words, the loader 11B may rewrite the control program stored in the memory 7b of the controller 7B by I2C interface temporarily formed only when the optical transceiver 1B is set in the loader 11B independent of the inherent I2C interface constituted by the lines, 7i and 7j.

An operation to download the program from the loader 11B to the XFP transceiver 1B will be further specifically described. Setting the XFP transceiver 1B in the loader 11B, the download clock is provided from the downloader 13B to the clock terminal 7e through the terminal P_Down 7p and AND gate 7y, while, the download data is provided to the data terminal 7f through the terminal Mod_DeSel 7k.

When the XFP transceiver 1B is set within the loader 11B, one of the inputs of AND gate 7y is forced in HIGH through the terminal Mod_Abs 7q; then, AND gate 7y is able to transfer the download clock provided from the downloader 13B directly to the clock terminal 7e of the download interface. Moreover, although the data terminal 7f is also connected to one of the I2C port 7a, this port 7v in the I2C port 7a is one of input ports, which does not affect the download data provided from the downloader 13B. That is, the download data are securely transferred to the data terminal 7f of the download interface through Mod_DeSel 7k. Similarly, two terminals, SCL 7m and SDA 7n, for the two-wired serial interface are floated when the XFP transceiver 1B is set in the loader 11B, which causes no influences for downloading the program.

Next, a status when the XFP transceiver 1B is set in the host system 15 will be described as referring to FIG. 8. The host system 15 generally includes an SPU 17 whose arrangements are similar to those of the aforementioned embodiment, and a host controller 19 with some peripheral resistors, 19a to 19c. When the host system 15 receives the XFP transceiver 1B therein, all control terminals, P_Down 7p, Mod_Abs 7q, Mod_DeSel 7k, SCL 7m and SDA 7n of the XFP transceiver 1B are coupled with the controller 19 of the host system.

The resistor 19a pulls the a line connected to Mod_Abs 7q up to the power supply Vcc, a resistor 19b pulls the line connected to SCL 7m up to the power supply Vcc, and a resistor 19c pulls the line connected to SDA 7n up to the power supply Vcc. These pull-up resistors, 19a to 19c, have resistance of 4.7 to 10.0 kΩ, which is defined by the XFP standard. Thus, the lines connected to terminals, SCL 7m and SDA 7n, constitute I2C interface. Specifically, the terminal 7s of I2C port 7a in the controller 7B receives the I2C clock from the host controller 19 through the terminal 7m and the line 7i; while the serial data through the terminal SDA 7n and the line 7j.

Next, the operation of the XFP transceiver 1B, and that of the host system 15, when the XFP transceiver 1B is set therein will be described. The host controller 19 controls the controller 7B in the XFP transceiver 1B and the SPU 17 in the host system. The host controller 19 first detects the existence or the setting of the XFP transceiver 1B through the level of the terminal Mod_Abs 7q; that is, when the XFP transceiver 1B is set, the level of the terminal 7q turns LOW because Mod_Abs 7q is pulled down to ground in the XFP transceiver 1B. In order to turn the level thereof securely, resistance $R_{19a}$ and $R_{9c}$, of the resistors, 19a and 9c, are determined by the procedure similar to those described for the SFP transceiver 1.

When the host system 15 receive the XFP transceiver 1B, AND gate 7y in one of inputs thereof connected to Mod_Abs 7q is set in LOW as described above, then, the output of AND gate 7y is forced to be LOW independent of statuses of the other input connected to P_Down 7p. That is, the signal provided to P_Down 7p from the host controller 19 is prohibited to be transferred to the clock terminal 7e. Then the download interface, namely terminals, 7e and 7f, are set in HOLD mode to set the data terminal 7f in high impedance. The data terminal 7f of the download interface causes no influences to statuses of Mod_DeSel 7k, the line 7h, and the terminal 7v that receives the command from the host controller 19.

Thus, the XFP transceiver 1B of the present embodiment, even it is set in a conventional host system 15, the communication between two devices, namely, the XFP transceiver 1B and the host system 15 may be securely established. Furthermore, the download interface, 7e and 7f, of the terminal of the controller 7B are set in HOLD, because the clock terminal 7e is kept in LOW, the controller 7B in the XFP transceiver 1B prohibits miss-loading of the program to the memory 7b.

The XFP transceiver 1B of the present embodiment, the clock terminal 7e for the download clock is connected to P_Down 7q and the other terminal 7f for the download data is to Mod_DeSel 7k, where terminals, P_Down and Model, are prepared in the standard of the XFP transceiver 1B. Thus, without modifying the mechanical arrangement, enlarging the circuit size, and increasing a cost for production; a revised control program may be downloaded within the memory in the XFP transceiver 1B.

(Modification)

Figure 9A:
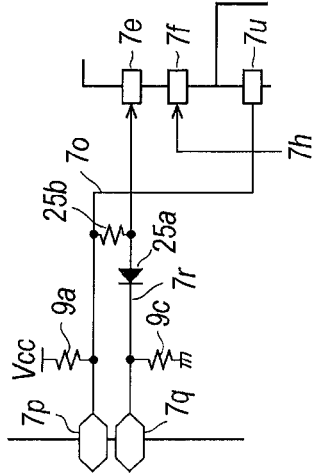
FIGS. 9A to 9F each shows peripheral circuits of the download interface, where they are modified from those shown in FIGS. 7 and 8.

Several modifications of the XFP transceiver 1B, in particular, concerning to peripheries of the controller 7B will be described as referring to FIGS. 9A to 9E. FIG. 9A includes an OR gate 7z replaced from AND gate 7y, and the clock terminal is 7e1 substituted for the clock terminal 7e each shown in FIG. 7. One of the inputs of OR gate 7z is coupled with P_Down 7p, while the other input is connected to Mod_Abs 7q. When the optical transceiver 1B is set in the host device 15, the input of OR gate is set in LOW, which sets the download interface in HOLD and the data terminal 7f is set in high impedance. On the other hand, when the XFP transceiver 1B is coupled with the loader 11B, the loader 11B keeps Mod_Abs 7q in HIGH, then, OR gate 7z operates as a buffer to pass a signal provided in the line 7o directly to the output thereof. Thus, the clock terminal 7e1 receives the download clock therein through P_Down 7p and the line 7o, and the download data in the data terminal 7f through Mod_DeSel 7k and the line 7r. Note that, the phase of the download clock, as far as the download clock varies between HIGH and LOW levels, is the same with that of the aforementioned arrangement shown in FIG. 7. Only the logical level to set the download interface in HOLD is reversed in the phase thereof.

Figure 9B:
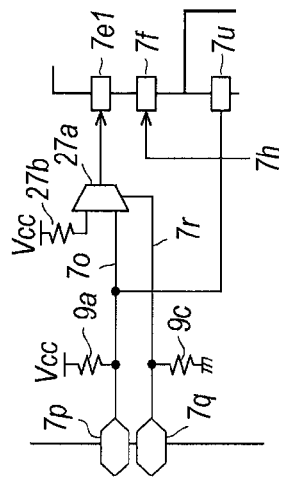

FIG. 9B shows a still another modification of the download interface of the XFP transceiver 1B. The download interface shown in FIG. 9B includes, substituted for AND gate 7y, a transistor 21a and a load resistor 21b. The transistor 21a couples the base thereof with Mod_Abs 7q, the emitter thereof with P_Down 7p, and the collector with the clock terminal 7k.

When the XFP transceiver 1B couples with the loader 11B, the loader 11B forces Mod_Abs 7q in HIGH. Providing the download clock from the loader 11B to P_Down 7p, the transistor 21a turns on when the download clock is in LOW, which lowers the level of the collector in LOW. On the other hand, the download clock from the loader 11B is in HIGH, which forces the base-emitter bias of the transistor 21a in substantially same, or, in negative bias. Then, the transistor 21a turns off and the collector level thereof is set in HIGH. Thus, the loader 11B may provide the download clock in the clock terminal 7e of the download interface.

When the XFP transceiver 1B is set in the host system 15, the host system 15 only detects the level of Mod_Abs 7q and this level is set in LOW by the pull down resistor 9c. When the base of the transistor 21a is set in LOW, the transistor 21a always turns off independent of the emitter level. Accordingly, the clock terminal 7e is kept HIGH which kills terminal 7e and sets the download interface in HIGH impedance. Thus, a mechanism to transfer the download clock from the loader 11B to the clock terminal 7e and to set the download interface in HOLD is realized in the arrangement shown in FIG. 9B.

Figure 9C:
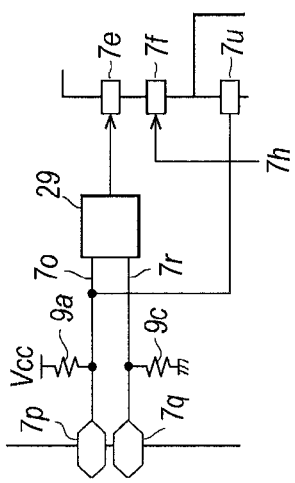

FIG. 9C replaces the npn transistor 21a shown in FIG. 9B with an n-MOSFET 23a. Even when the n-MOSFET 23a is put between Mod_Abs 7q and the clock terminal 7e, the circuit of FIG. 9C shows the function same as those shown in FIG. 9B. The n-MOSFET 23a operates as an analog switch depending on the signal provided to the gate thereof. When the gate of the n-MOSFET 23a is set in LOW, the n-MOSFET 23a isolates the drain and the source thereof, namely, the clock terminal 7e is isolated from the P_Down 7q and kept in LOW, which sets the download interface in HOLD. On the other hand, when the gate of the n-MOSFET 23a is in HIGH, the clock appearing in P_Down 7p is transferred to the clock terminal 7e.

Figure 9D:
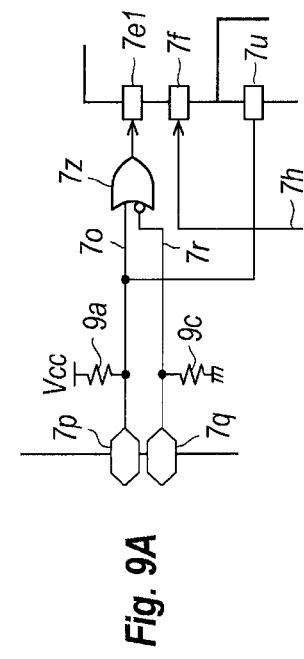

FIG. 9D is still another modification of the circuit accompanied with the download interface according to the embodiment of the present application. The circuit around the download interface includes, substituted for the transistor, 21a or 23a, a diode 25a and a resistor 25b. When the XFP transceiver is set in the host system 15, the terminal Mod_Abs 7k is set in LOW by the pull down resistor 9c, which forces the clock terminal 7e in LOW. Accordingly, the download interface is kept in HOLD to set the data terminal 7f in HIGH impedance. On the other hand, when the loader 11B couples with the XFP transceiver 1B, Mod_Abs 7q is set in HIGH in the loader 11B, which substantially kills the diode 25a and the signal provided to P_Down 7p is transferred to the clock terminal 7e as leaving the level thereof. That is, the download clock provided from the loader 11B is able to be provided to the download interface. Thus, the peripheral circuit of the diode 25a with the resistor 25b may show the function same with those of the circuit of FIG. 7.

Figure 9E:
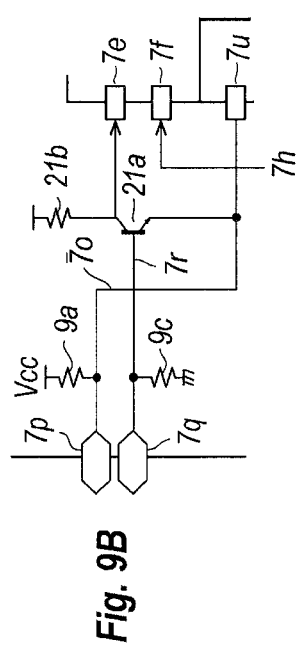
Figure 9F:
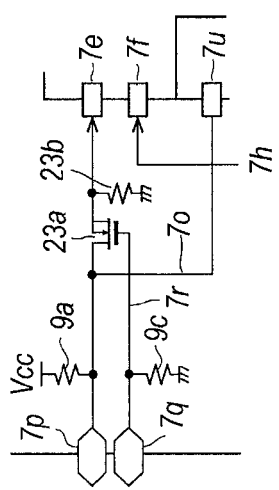

FIGS. 9E and 9F show still other modifications of the peripheral circuit of the download interface. The circuits shown in FIGS. 9E and 9F include, substituted for the transistor 21a, the MOSFET 23a, or the diode 25a, a selector 27a or a programmable logic device 29 (PLD). The selector 27a changes the inputs thereof, one of which is pulled up to the power supply Vcc. When the host system 15 receives the XFP transceiver 1B, Mod_Abs 7q is set in LOW and the selector 27a selects one of the inputs pulled up to the power supply, which forces the clock terminal 7e1 in HIGH and the download interface in HOLD. When the loader 11B couples with the XFP transceiver 1B, Mod_Abs is set in HIGH, and the selector 27a selects the signal line 7o to pass the download clock from the loader 11B to the clock terminal 7e1. Because the input of the selector is set in HIGH; the clock terminal 7e1 of the download interface has the negative logic same as the case shown in FIG. 9A. The PLD 29 in FIG. 9F digitally realizes the function same as that shown in FIG. 9C. That is, depending on the level of the line 7r, the PLD 29 passes the signal on the line 7o to the clock terminal 7e.

While there has been illustrated and described what are presently considered to be example embodiments of the present invention, it will be understood by those skilled in the art that various other modifications may be made, and equivalents may be substituted, without departing from the true scope of the invention.

For instance, the embodiment for the XFP transceiver 1 uses P_Down 7p to provide the download clock to the controller 7B; however, the XFP transceiver 7B may use another control terminal for the download clock. For instance, a terminal Tx_Dis, which disables transmitter to output an optical signal, may be utilized for the download clock, and the terminal P_Down 7p is able to be utilized for the download data instead for Mod_DeSel 7k. Thus, the XFP transceiver 7B may optionally select two terminals each for the download clock and the download data among three control terminals of P_Down, Tx_Dis, and Mod_DeSel.

Thus, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A pluggable optical transceiver to be set in a host system, the pluggable optical transceiver including a controller accompanied with a memory to store a program by which the pluggable optical transceiver monitors and controls statuses within the pluggable optical transceiver, the pluggable optical transceiver providing a first control terminal, a second control terminal, and a third control terminal, wherein the first control terminal is pulled down to a ground by a resistor such that the host system detects the existence of the pluggable optical transceiver therein, and wherein the controller includes a download interface comprising, a clock terminal to receive a download clock to download the program, the clock terminal being coupled with the first control terminal, and a data terminal to receive a download data of the program, the data terminal being coupled with the third control terminal, wherein the download interface becomes in a hold mode to set the data terminal in high impedance when the pluggable optical transceiver is set in the host system and the first control terminal is set in LOW.

2. The pluggable optical transceiver of claim 1, wherein the pluggable optical transceiver follows a standard of a small form factor pluggable (SFP) transceiver, and the first to third control terminals correspond to MOD_DEF0, MOD_DEF1, and MOD_DEF2 terminals, respectively, of the SFP standard.

3. The pluggable optical transceiver of claim 2, wherein MOD_DEF1 and MOD_DEF2 are pulled up to power supply to consist a two-wired serial interface to communicate with the host system.

4. The pluggable optical transceiver of claim 3, wherein the MOD_DEF1 and MOD_DEF2 constitute a serial clock (SCL) line and a serial data (SDA) line of an I2C interface.

5. The pluggable optical transceiver of claim 1, wherein the pluggable optical transceiver follows a standard of a 10 Gbit small form factor pluggable (XFP) transceiver, and the first and third control terminals correspond to P_Down and Mod_DeSel terminals, respectively, of the XFP standard.

6. The pluggable optical transceiver of claim 5, wherein the first and third control terminals are pulled up to a power supply to constitute a two-wired serial interface.

7. The pluggable optical transceiver of claim 5, wherein the pluggable optical transceiver further provides a Mod_Abs terminal pulled down to a ground by a resistor to mask the P_Down terminal when the pluggable optical transceiver is set in the host system.

8. The pluggable optical transceiver of claim 7, further including an AND gate having two inputs each coupled with the Mod_Abs and P_Down terminals and an output coupled with the clock terminal of the controller.

9. The pluggable optical transceiver of claim 7, further including a transistor with a base, an emitter and a collector, the base being coupled with the Mod_Abs terminal, the emitter being coupled with the P_Down terminal, and the collector being coupled with the clock terminal of the controller.

10. The pluggable optical transceiver of claim 7, further including a diode with an anode and a cathode, the cathode being coupled with the Mod_Abs terminal, the anode being coupled with the P_Down terminal and the clock terminal of the controller.

11. The pluggable optical transceiver of claim 7, further including a selector with two inputs, an output and a selector input, one of two inputs being coupled with the P_Down terminal, the other of two inputs being coupled with a power supply, the output being coupled with the clock terminal of the controller, and the selector input being coupled with the Mod_Abs terminal.

12. The pluggable optical transceiver of claim 7, further including a switch put between the terminal P_Down and the clock terminal of the controller, the terminal Mod_Abs controlling a status of the switch.

13. The pluggable optical transceiver of claim 12, wherein the switch is an analog switch constituted by an n-MOSFET.

14. The pluggable optical transceiver of claim 12, wherein the switch is a digital switch constituted by a programmable logic device.

* * * * *